United States Patent [19]

Nonoyama et al.

[11] Patent Number: 4,944,983

[45] Date of Patent: Jul. 31, 1990

[54] SLOPED SUBSTRATE FOR A THERMAL HEAD AND METHOD OF MANUFACTURING THE SAME

[75] Inventors: Osamu Nonoyama; Masahiro Kato, both of Aichi, Japan

[73] Assignee: NGK Spark Plug Co., Ltd., Aichi, Japan

[21] Appl. No.: 377,688

[22] Filed: Jul. 10, 1989

[30] Foreign Application Priority Data

Jul. 11, 1988 [JP] Japan .............................. 63-170860
Apr. 14, 1989 [JP] Japan .............................. 1-94995

[51] Int. Cl.$^5$ .............................. G01D 15/10; B32B 1/04

[52] U.S. Cl. .............................. 428/81; 428/192; 428/220; 346/76 PH; 219/216

[58] Field of Search .............................. 428/81, 192, 220; 346/76 PH; 219/216

[56] References Cited

U.S. PATENT DOCUMENTS 4,651,168 3/1987 Terajima et al. .............. 346/76 PH

FOREIGN PATENT DOCUMENTS 57-93452 6/1982 Japan .
198034 12/1986 Japan .

*Primary Examiner*—Alexander S. Thomas
*Attorney, Agent, or Firm*—Sughrue, Mion, Zinn, Macpeak & Seas

[57] ABSTRACT

A sloped substrate for a thermal head made of ceramic for a thermal head of a thermosensitive printing device, in which a sloped surface of 200 μm to 2,000 μm in width is formed between a main plane surface of the substrate and a subplane surface thereof and a glaze is bonded by firing to the main plane and the subplane surfaces and the sloped surface so that the thickness of the glaze is 100 μm or less.

3 Claims, 2 Drawing Sheets

SLOPED SUBSTRATE FOR A THERMAL HEAD AND METHOD OF MANUFACTURING THE SAME

FIELD OF THE INVENTION

The present invention relates generally to a thermal head of a thermosensitive printing device. More particularly, the invention relates to a sloped substrate for the thermal head and a method of manufacturing the same.

BACKGROUND OF THE INVENTION

There is known a conventional thermal head of a plane type in which a driver IC is provided on one portion of a main plane surface of the substrate of the thermal head and a heating resistor is provided at another portion of the main plane surface.

There is known another conventional thermal head of a subplane type in which merely a heating resistor is provided on a portion of a subplane surface of the substrate of the thermal head whereas a driver IC is not provided on any portion of the subplane surface. As shown in FIG. 1, a substrate 1 made of alumina or the like has a main plane surface la on which the driver IC not shown in FIG. 1 is provided, and a subplane surface 1*b* on which a heating resistor 3 is provided and which extends perpendicularly to the main plane surface. A glaze 2 is bonded by firing to the main and subplane surfaces 1*a* and 1*b* of the substrate 1 in order to keep the surfaces flat and smooth. As disclosed in the Laid-open Japanese Patent Application (OPI) No. 24695/85, the thermal head has various advantages such as that the heating resistor 3 comes into good contact with thermosensitive paper, a relief means for preventing the driver IC from coming into contact with a platen does not need to be provided, it is therefore easy to make the whole thermal head compact, and it is easy to secure the flatness of the portion on which the heating resistor 3 is provided.

The thickness of the glaze 2 on an edge 1*c* thereof between the main plane surface 1*a* and subplane surface 1*b* of the substrate 1 tends to be smaller than that of the glaze on the main plane and the subplane surfaces due to the surface tension of the glaze as the glaze is bonded by firing to the plane surfaces. If the thickness of the glaze 2 on the edge 1*c* is set at a proper value, that of the glaze on the main plane and the subplane surfaces 1*a* and 1*b* becomes larger than the proper value so as to deteriorate a heat transmitting property of the thermal head to lower a printing speed thereof. On the other hand, if the thickness of the glaze 2 on the main plane and the subplane surfaces 1*a* and 1*b* is set at the proper value, that of the glaze on the edge 1*c* becomes smaller than the proper value so as to lower the flatness and smoothness of the glaze on the edge thereof to disconnect a wiring pattern of the thermal head. This is a problem. Further, since the area where the heating resistor 3 can be provided extends in the direction of the thickness of the substrate 1, the degree of freedom of a combination of the area and the thickness is extremely limited. This is another problem.

Although the substrate of yet another conventional thermal head is provided with a sloped surface between the main plane and subplane surfaces of the substrate by chamfering the edge between the plane surfaces or by the like and a glaze and a heating resistor are then sequentially provided on the sloped surface as disclosed in the Laid-open Japanese Utility Model Application (OPI) No. 13333/89, the glaze is not provided on the subplane surface. For that reason, the wiring pattern of the thermal head is likely to be disconnected. Further, the thickness of the glaze would not be controlled in the Application.

SUMMARY OF THE INVENTION

The present invention was made in order to solve the above-mentioned problems accompanying the conventional substrate.

Accordingly, it is an object of the present invention to provide a substrate made of ceramic for a thermal head, in which a sloped surface of 200 μm to 2,000 μm in width is formed between a main plane surface of the substrate and a subplane surface thereof and a glaze is bonded by firing to the main plane and the subplane surfaces and the sloped surface so that the thickness of the glaze is 100 μm or less.

It is another object of the present invention to provide a method of manufacturing a substrate made of ceramic for a thermal head, which comprises steps in which the edge between a main plane surface of the substrate and a subplane surface thereof is ground so that a sloped surface having a predetermined width is formed between both the plane surfaces; a tape made by mixing a powder of a glass with a resin is stuck to the plane surfaces and the sloped surface; the resin of the tape is removed therefrom by pre-firing; and the glass remaining on the plane surfaces and the sloped surface after the pre-firing is bonded by firing as a glaze to the surfaces and the sloped surface at a temperature higher than that of the pre-firing.

Since the sloped surface is formed between the main plane and subplane surfaces of the substrate made of ceramic in accordance with the present invention, each of the angle between the main plane surface and the sloped surface and that between the sloped surface and the subplane surface is an obtuse angle of 105° to 165°. For that reason, the difference between the thickness of the glaze on the main plane and the subplane surfaces and that of the glaze on the sloped surface, the edge between the main plane surface and the sloped surface or the edge between the sloped surface and the subplane surface is equal to or less than a half of the difference between the thickness of the glaze on the main plane and subplane surfaces of the afore-mentioned conventional substrate shown in FIG. 1 and that of the glaze on the edge between the main plane and the subplane surfaces thereof.

As a result, it is not likely that the wiring pattern of the thermal head having the substrate provided in accordance with the present invention is disconnected nor the heat transmitting property of the thermal head is deteriorated. Since the width of the sloped surface of the substrate can be optionally determined as if the thickness of the substrate is unchanged, the degree of freedom of the selection of the area where a heating resistor can be provided is heightened or rather expanded if the resistor is provided on the sloped surface. The width of the sloped surface is set in a range between 200 μm to 2,000 μm. If the width of the sloped surface were less than 200 μm, the difference between the thickness of the glaze on the main plane and the subplane surfaces and that of the glaze on the sloped surface and the edges would not be controlled to be small, rendering the problems as encountered in the conventional thermal head with the sloped surface. If the width of the sloped surface were more than 2,000 μm, the heating resistor would not be put in good contact with thermosensitive paper, so that the paper contact property of the thermal head would be nearly the same as that of the conventional thermal head. The most preferable width of the sloped surface is in a range between 350 μm and 1,200 μm.

The thickness of the glaze should be large enough to secure the flatness of the plane surfaces and sloped surface of the substrate. However, if the thickness of the glaze were more than 100 μm, the heat transmitting property of the substrate would be greatly deteriorated. Therefore, the thickness of the glaze is set at 100 μm or less. When the substrate is made of an alumina containing 90% to 99.5% by weight of $Al_2O_3$ and a surface roughness Ra of the sloped surface is in a range between 0.2 μm to 1 μm, the optimal thickness of the glaze on the sloped surface is 20 μm to 70 μm. The preferable relationship between the width W of the sloped surface and the thickness d of the glaze thereof is determined by: $10 \leqq W/d \leqq 30$.

DESCRIPTION OF THE PREFERRED EMBODIMENT

An preferred embodiment of the present invention is hereinafter described in detail with reference to accompanying drawings.

Figure 1:
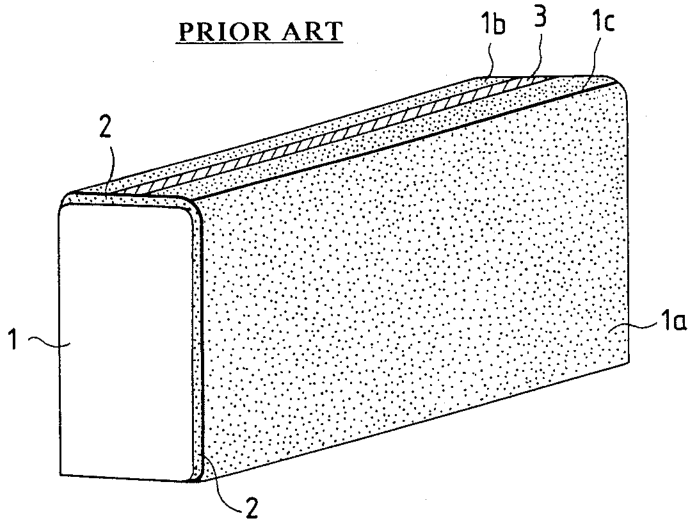
FIG. 1 PRIOR ART
FIG. 1 is a perspective view of the substrate of a conventional thermal head.
Figure 2:
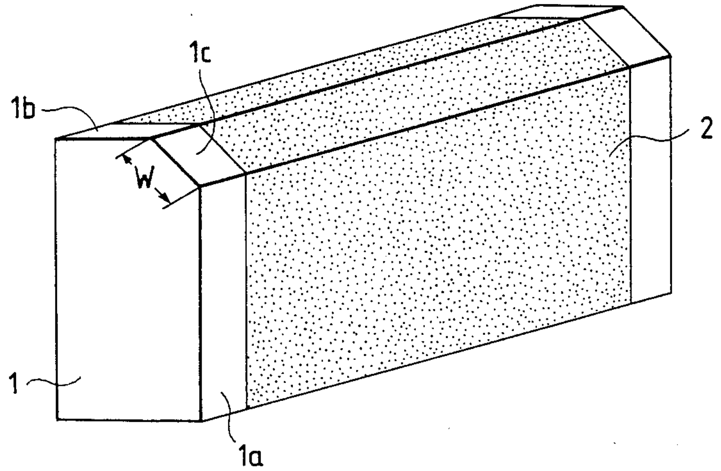
FIG. 2 is a perspective view of a sloped substrate embodying the present invention.

A sloped substrate 1, which is the embodiment for a thermal head, was made of a sintered material containing 97% by weight of $Al_2O_3$ and was provided with a sloped surface 1*c* having a predetermined width W and extending between a main plane surface 1*a* of the substrate and the subplane surface 1*b* thereof by grinding an edge formed by and between said surfaces 1*a* and 1*b*, as shown in FIG. 2. The surface of the sloped surface 1*c* was polished so that the surface roughness Ra thereof became 0.5 μm. After that, a tape, which was the same as that for the third embodiment disclosed in the Laid-open Japanese Patent Application No. 55453/85 and was composed of 50% by weight of glass powder and the rest of a resin as a binder was stuck to the main plane surface 1*a*, the sloped surface 1*c* and the subplane surface 1*b*. The resin was thereafter removed or rather dewaxed from the tape at a pre-firing temperature of 200° C. The remaining glass powder was then fired at a temperature of 1,000° C. so that the glass powder was made into a glaze 2 bonding to the substrate.

Figure 3A:
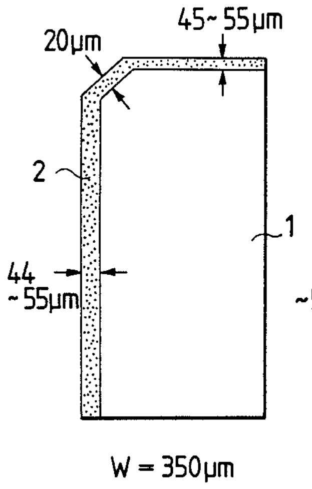
FIGS. 3A, 3B and 3C are cross-sectional views of examples of the sloped substrate, in which the width of the sloped surface thereof is set at different values.
Figure 3B:
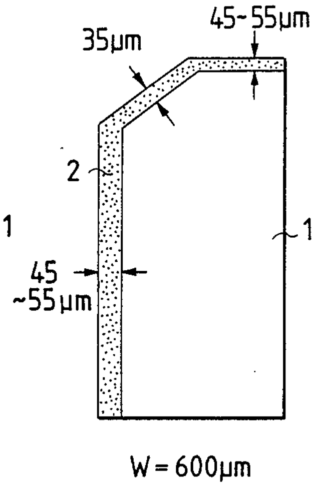
Figure 3C:
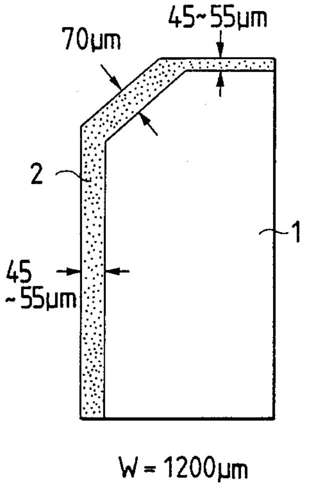
Figure 4:
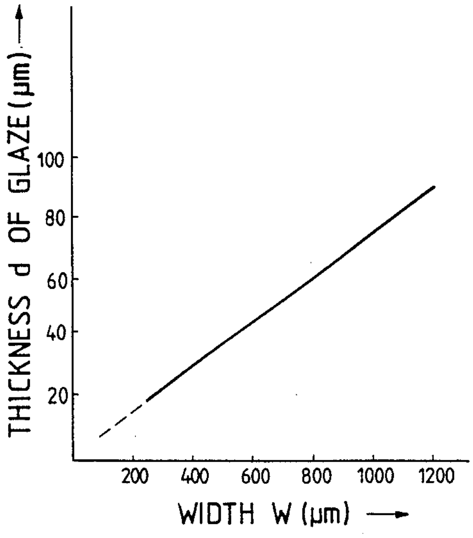
FIG. 4 is a graph showing the relationship between the width of the sloped surface and the thickness of a glaze thereon.

FIGS. 3A to 3C are cross-sectional views of different examples of the sloped substrate 1, in which the width W of the sloped surface 1*c* was set at different optional values as the thickness of the tape was kept at 135 μm. FIG. 4 is a graph showing the relationship between the thickness d of the glaze 2 on the sloped surface 1*c* and the width W of the sloped surface.

It is understood from FIGS. 3A to 3C and FIG. 4 that the thickness d of the glaze 2 on the sloped surface 1*c* can be altered by changing the width W of the sloped surface, even if the thickness of the glaze on the main plane and the subplane surfaces 1*a* and 1*b* remains constant. The thickness of the glaze 2 on the edge between the main plane surface 1*a* and the sloped surface 1*c* was nearly middle between that of the glaze on the main plane surface and that of the glaze on the sloped surface. The thickness of the glaze 2 on the edge between the main plane surface 1*b* and the sloped surface 1*c* was nearly middle between that of the glaze on the subplane surface and that of the glaze on the sloped surface.

It is understood from FIG. 4 that the thickness d of the glaze 2 on the sloped surface 1*c* and the width W of the sloped surface is nearly in a linear proportion to each other. For that reason, the width W of the sloped surface 1*c* can easily be preset at such a value as to set the thickness d of the glaze 2 thereon at a desired value. Therefore, the thickness d of the glaze 2 can be prevented from becoming smaller or larger than an expected and desired value.

Figure 5:
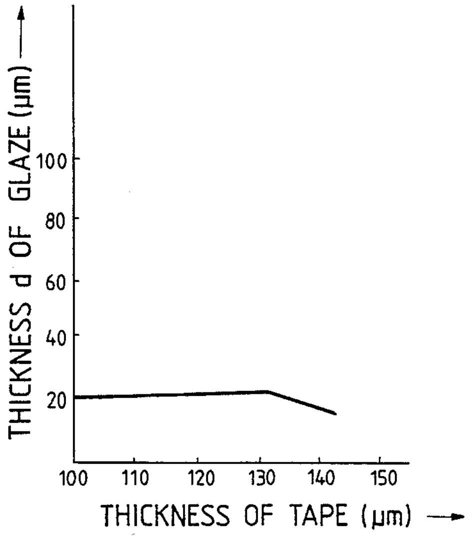
FIG. 5 is a graph showing the relationship between the thickness of a tape for the glaze and the thickness of the glaze itself.

FIG. 5 is a graph showing the measured thickness d of the glaze 2 on the sloped surface 1*c*, which resulted as the width W of the sloped surface was kept at 350 μm and the thickness of the tape was changed. It is understood from FIG. 5 that the thickness d of the glaze 2 on the sloped surface 1*c* was hardly altered even if the thickness of the tape was varied. In other words, it is understood from FIG. 5 that the thickness of the glaze 2 on the sloped surface 1*c* mainly depended on the width W of the sloped surface, not on an amount of glass powder of the tape.

According to the present invention, the thickness of a glaze between the main plane and subplane surfaces of a sloped substrate for a thermal head can be set at such a value, independently of the thickness of the glaze on the main plane and the subplane surfaces, simply by presetting the width of the sloped surface of the substrate, that the wiring pattern of the thermal head is not disconnected. For that reason, optional one of various printing properties can easily be obtained for the thermal head provided with a heating resistor on the glaze on the subplane surface so as to apply electricity to the resistor to perform a good printing on thermosensitive papers.

We claim:

1. A sloped substrate for a thermal head, comprising:

a main plane surface;

a subplane surface which is perpendicular to said main plane surface;

a sloped surface extending between an edge of said main plane surface and an edge of said subplane surface, said sloped surface having a width in a range between 200 μm to 2,000 μm; and a glaze bonded by firing to said main plane surface, said subplane surface and said sloped surface, said glaze having a thickness of 100 μm or less.

2. The sloped substrate of claim 1, wherein said sloped surface has a surface roughness of 0.2 μm to 1 μm, and the width W of said sloped surface and the thickness d of the glaze bonded by firing thereto are as follows;

$350\ \mu m \leqq W \leqq 1,200\ \mu m$ $20\ \mu m \leqq d \leqq 70\ \mu m$ $10 \leqq W/d \leqq 30$

3. The sloped substrate of claim 1, wherein the substrate is made of alumina.

* * * * *